United States Patent [19]

Moriya et al.

[11] Patent Number: 4,753,990
[45] Date of Patent: Jun. 28, 1988

[54] METHOD FOR PRODUCING A GRAFTED ETHYLENE-ACRYLIC ACID ESTER COPOLYMER

[75] Inventors: Yasuo Moriya; Nobuyoshi Suzuki; Yuji Okada, all of Aichi, Japan

[73] Assignee: Nippon Oil and Fats Co., Ltd., Tokyo, Japan

[21] Appl. No.: 928,555

[22] Filed: Nov. 10, 1986

[30] Foreign Application Priority Data

Nov. 22, 1985 [JP] Japan ................. 60-261479

[51] Int. Cl.$^4$ .................. C08L 53/00; C08L 33/08
[52] U.S. Cl. ............................. 525/94; 525/277; 525/299; 525/941
[58] Field of Search ................. 525/94, 223

[56] References Cited

U.S. PATENT DOCUMENTS 4,315,997  2/1982  Ujikawa et al. ............... 525/94
4,665,131  5/1987  Moriya et al. ............... 525/94
4,665,132  5/1987  Moriya et al. ............... 525/94

FOREIGN PATENT DOCUMENTS 178141  4/1986  European Pat. Off. .

OTHER PUBLICATIONS

Patents Abstracts of Japan, vol. 7, No. 235 Oct. 19, 1983.

Primary Examiner—Carman J. Seccuro
Attorney, Agent, or Firm—Parkhurst & Oliff

[57] ABSTRACT

An ethylene-acrylic acid ester copolymer can be easily grafted in a high graft efficiency with a peroxy group-containing block copolymer consisting of segments of copolymer A, which is a copolymer of a (meth)acrylic acid ester monomer or its mixture with a radically copolymerizable monomer, with a radically copolymerizable peroxycarbonate, and segments of (co)polymer B, which is different from copolymer A in the monomer composition and does not contain a monomer unit of the radically copolymerizable peroxycarbonate. The grafted ethylene-acrylic acid ester copolymer can be effectively used as a compatibilizing agent in a polymer blend of polyolefin with styrene (co)polymer, as an emulsifying agent in an emulsion of high polymer, or as an adhesive at the interface of polyolefin and styrene (co)polymer.

9 Claims, No Drawings

METHOD FOR PRODUCING A GRAFTED ETHYLENE-ACRYLIC ACID ESTER COPOLYMER

BACKGROUND OF THE INVENTION (1) Field of the Invention

The present invention relates to a method for producing a grafted ethylene-acrylic acid ester copolymer obtained by grafting a specifically limited block copolymer onto an ethylene-acrylic acid ester copolymer, and more particularly relates to a method for producing a grafted ethylene-acrylic acid ester copolymer in a simple manner and in a high graft efficiency.

(2) Related Art Statement

Ethylene-acrylic acid ester copolymer is flexible over a wide temperature range and has a high heat resistance, and therefore the copolymer is used in the form of a foamed article or is used as electric parts. Particularly, it has recently been investigated to use a blend of an ethylene-acrylic acid ester copolymer with, for example, polyphenylene ether, as an improver of shock resistance of engineering plastics.

In order to produce a homogeneous blend of ethylene-acrylic acid ester copolymer with engineering plastics, particularly polyphenylene ether, there has been attempted to graft styrene onto an olefin (co)polymer. For example, Japanese Patent Application Laid-open Specification No. 226,042/84 discloses a method, wherein polystyrene is grafted onto an olefin (co)polymer in the presence of an organic peroxide under a melted state; and Japanese Patent Laid-open Specification No. 185,309/82 discloses a method, wherein an olefin (co)polymer is impregnated with styrene monomer, and the impregnated styrene monomer is polymerized, whereby polystyrene is grafted onto the olefin (co)polymer. However, in the former method, ethylene-acrylic acid ester copolymer is essentially incompatible with polystyrene, and the grafting reaction hardly occurs, and hence the layers formed of ethylene-acrylic acid ester copolymer segments separate from layers formed of polystyrene segments. In the latter method, a polymerization reaction is carried out, and therefore complicated steps are required, and further it is difficult to control the polymerization temperature and the molecular weight of the impregnated ethylene-acrylic acid ester copolymer in the commercial production of the grafted ethylene-acrylic acid ester copolymer, and moreover the graft efficiency is poor.

The grafting of polystyrene onto an ethylene-acrylic acid ester copolymer can be carried out by the above described conventional methods. However, the resulting graft copolymer has not satisfactorily excellent properties due to its production method. This is due to the poor dispersion of a polymer, which is different from an ethylene-acrylic acid ester copolymer, into the ethylene-acrylic acid ester copolymer. In order to improve the dispersion of a polymer, which is different from an ethylene-acrylic acid ester copolymer, into the ethylene-acrylic acid ester copolymer, and to make the particle size of the polymer to be dispersed in the ethylene-acrylic acid ester copolymer into a size smaller than a certain value, it is necessary to produce a graft copolymer of an ethylene-acrylic acid ester copolymer with a polymer different from the ethylene-acrylic acid ester copolymer. However, in the above described methods, the yield of the graft copolymer is low, and the above described conventional methods are low in the effect.

SUMMARY OF THE INVENTION

The inventors have made various investigations in order to solve the above described drawbacks of conventional methods, and found out that a grafted ethylene-acrylic acid ester copolymer can be easily produced in a high graft efficiency by using a specifically limited block copolymer, and accomplished the present invention.

That is, the feature of the present invention lies in a method for producing a grafted ethylene-acrylic acid ester copolymer, comprising grafting a block copolymer consisting of segments of copolymer A and segments of (co)polymer B onto an ethylene-acrylic acid ester copolymer, said copolymer A being a copolymer of a (meth)acrylic acid ester monomer or a mixture of a (meth)acrylic acid ester monomer and a radically copolymerizable monomer copolymerizable with the (meth)acrylic acid ester monomer, with a radically copolymerizable peroxycarbonate represented by the following general formula (I), and said (co)polymer B being a (co)polymer having a monomer composition different from that of copolymer A and not containing a monomer unit of the radically copolymerizable peroxycarbonate represented by the following general formula (I), said general formula (I) being

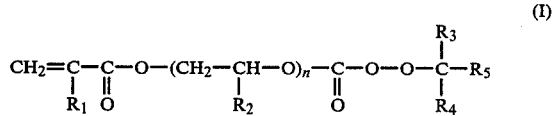

wherein $R_1$ represents a hydrogen atom or an alkyl group having 1 to 2 carbon atoms; $R_2$ represents a hydrogen atom or a methyl group; $R_3$ and $R_4$ represent same or different alkyl groups having 1–4 carbon atoms; $R_5$ represents a phenyl group or an alkyl group or alkyl-substituted phenyl group having 1–12 carbon atoms or a cycloalkyl group having 3–12 carbon atoms; and n is a positive integer of 1 or 2.

DESCRIPTION OF THE PREFERRED EMBODIMENT

The radically copolymerizable peroxycarbonates (hereinafter, merely referred to as "peroxycarbonates") to be used for the production of the specifically limited block copolymer of the present invention, which are represented by the general formula (I), include t-butylperoxy acryloyloxyethyl carbonate, t-hexylperoxy acryloyloxyethyl carbonate, 1,1,3,3-tetramethylbutylperoxy acryloyloxyethyl carbonate, cumylperoxy acryloyloxyethyl carbonate, p-isopropylcumylperoxy acryloyloxyethyl carbonate, t-butylperoxy methacryloyloxyethyl carbonate, t-amylperoxy methacryloyloxyethyl carbonate, 1,1,3,3-tetramethylbutylperoxy methacryloyloxyethyl carbonate, cumylperoxy methacryloyloxyethyl carbonate, t-butylperoxy acryloyloxyethoxyethyl carbonate, t-hexylperoxy acryloyloxyethoxyethyl carbonate, cumylperoxy acryloyloxyethoxyethyl carbonate, t-butylperoxy methacryloyloxyethoxyethyl carbonate, t-amylperoxy methacryloyloxyethoxyethyl carbonate, cumylperoxy methacryloyloxyethoxyethyl carbonate, t-butylperoxy acryloyloxyisopropyl carbonate, t-hexylperoxy acryloyloxyisopropyl carbonate, 1,1,3,3-tetramethylbutylperoxy acryloyloxyisopropyl carbonate, cumylperoxy acryloyloxyisopropyl carbonate, t-butylperoxy methacryloyloxyisopropyl carbonate, t-amylperoxy methacryloyloxyisopropyl carbonate, 1,1,3,3-tetramethylbutylperoxy methacryloyloxyisopropyl carbonate, cumylperoxy methacryloyloxyisopropyl carbonate, and the like.

Among them, there can be preferably used t-butylperoxy acryloyloxyethyl carbonate, t-hexylperoxy acryloyloxyethyl carbonate, t-butylperoxy methacryloyloxyethyl carbonate, t-hexylperoxy methacryloyloxyethyl carbonate, and t-butylperoxy acryloyloxyethoxyethyl carbonate.

The (meth)acrylic acid ester monomers to be used for the production of copolymer A of the specifically limited block copolymer of the present invention include methyl (meth)acrylate, ethyl (meth)acrylate, i-propyl (meth)acrylate, n-butyl (meth)acrylate, n-propyl (meth)acrylate, 2-ethylhexyl (meth)acrylate, lauryl (meth)acrylate, stearyl (meth)acrylate and the like.

The radically copolymerizable monomers to be used in the present invention as a monomer copolymerizable with the (meth)acrylic acid ester monomer include (meth)acrylic acid ester monomers, such as methyl (meth)acrylate, ethyl (meth)acrylate, i-propyl (meth)acrylate, n-butyl (meth)acrylate, n-propyl (meth)acrylate, 2-ethylhexyl (meth)acrylate, lauryl (meth)acrylate, stearyl (meth)acrylate and the like; aromatic vinyl monomers, such as styrene, α-methylstyrene, p-methylstyrene and the like; vinyl ester monomers, such as vinyl acetate, vinyl propionate and the like; unsaturated nitrile monomers, such as acrylonitrile, methacrylonitrile and the like; conjugated diene monomers, such as butadiene, isoprene and the like; unsaturated fatty acid monomers, such as acrylic acid, methacrylic acid and the like; α-olefin monomers, such as ethylene, propylene, butene-1 and the like; halogenated vinyl monomers, such as vinyl chloride, vinylidene chloride and the like; and the like. These radically copolymerizable monomers are selected depending upon the use purpose of the resulting grafted ethylene-acrylic acid ester copolymer.

In the present invention, monomers to be used for the production of (co)polymer B are not particularly limited so long as (co)polymer B is different from copolymer A in the monomer composition. Because, the monomers are selected depending upon the purpose for modifying ethylene-acrylic acid ester copolymer by grafting.

In general, radically polymerizable monomers are preferably used as the monomer for the production of (co)polymer B. These monomers are, for example, aromatic vinyl monomers, such as styrene, α-methylstyrene p-methylstyrene and the like; (meth)acrylic acid ester monomers, such as methyl (meth)acrylate, ethyl (meth)acrylate, n-butyl (meth)acrylate and the like; vinyl ester monomers, such as vinyl acetate, vinyl propionate and the like; unsaturated nitrile monomers, such as acrylonitrile, methacrylonitrile and the like; conjugated diene monomers, such as butadiene, isoprene and the like; unsaturated fatty acid monomers, such as acrylic acid, methacrylic acid and the like; α-olefin monomers, such as ethylene, propylene, butene-1 and the like; halogenated vinyl monomers, such as vinyl chloride, vinylidene chloride and the like; and the like.

The amount of the block copolymer to be used in the grafting reaction of the block copolymer onto the ethylene-acrylic acid ester copolymer in the present invention should be varied depending upon the use purpose and use field of the resulting grafted ethylene-acrylic acid ester copolymer. In general, the grafting reaction of the block copolymer onto the ethylene-acrylic acid ester copolymer is carried out in a mixing ratio that the mixture of the ethylene-acrylic acid ester copolymer and the block copolymer consists of 10–99.9% by weight of the ethylene-acrylic acid ester copolymer and 90–0.1% by weight of the block copolymer, preferably 50–99% by weight of the ethylene-acrylic acid ester copolymer and 50–1% by weight of the block copolymer.

When the amount of the block copolymer to be used is less than 0.1% by weight, ethylene-acrylic acid ester copolymer can not be satisfactorily modified. When the amount of the block copolymer to be used exceeds 90% by weight, the physical properties of ethylene-acrylic acid ester copolymer are deteriorated.

Further, the block copolymer of the present invention must contain at least 0.002% by weight of active oxygen. When the amount of active oxygen is less than 0.002% by weight, a grafting reaction of the block copolymer onto ethylene-acrylic acid ester copolymer can not be satisfactorily carried out, and hence the mechanical and physical properties of the ethylene-acrylic acid ester copolymer are deteriorated and further the blending properties of the grafted ethylene-acrylic acid ester copolymer onto other resin are deteriorated.

In the present invention, the block copolymer is produced, for example, by polymerizing completely a monomer mixture to be used for the production of copolymer A in the presence of a polymeric peroxide (polymeric azo-compound) as an initiator under a polymerization condition that the resulting copolymer A contains peroxy groups in its main polymer chain, and then adding to the mass containing copolymer A a monomer or a monomer mixture to be used for the production of (co)polymer B, and subjecting the resulting mixture to a polymerization reaction to complete the polymerization. The polymerization temperature in the formation of (co)polymer B should be determined depending upon the decomposition rate of the polymeric peroxide (polymeric azo-compound). For example, when a diacyl type polymeric peroxide is used as an initiator, it is preferable to carry out the polymerization reaction at a temperature of 50°–80° C.

The peroxy group-containing block copolymer to be used in the present invention is produced by the above described method.

The ethylene-acrylic acid ester copolymer to be used in the present invention are ones obtained by copolymerizing ethylene with an acrylic acid ester under high temperature and high pressure. Particularly, a copolymer of ethylene with ethyl acrylate is preferably used in the present invention. The content of acrylic acid ester in the ethylene-acrylic acid ester copolymer should be 5–50% by weight, preferably 5–30% by weight.

According to the present invention, when an ethylene-acrylic acid ester copolymer is blended with a peroxy group-containing block copolymer under a melted state, a grafting reaction of the block copolymer onto the ethylene-acrylic acid ester copolymer occurs easily. The melting temperature in the grafting should be 150°–300° C., preferably 150°–250 C. When the melting temperature is lower than 150° C., the decomposition rate of peroxy group is extremely low, and a long time is required in the grafting reaction. When the melting temperature is higher than 300° C., the peroxy group decomposes at an extremely high rate, and the efficiency of the grafting reaction is very low. Further, vinyl (co)polymer decomposes at a temperature higher than 300° C. Therefore, a melting temperature lower than 150° C. or higher than 300° C. should not be used. The grafting reaction under melted state can be carried out by means of, for example, an extruder, injection molding machine, kneader or the like.

Further, the peroxy group-containing block copolymer of the present invention can be used together with other peroxides, particularly organic peroxides, in order to improve the splitting effect for hydrogen from ethylene-acrylic acid ester copolymer. As the organic peroxide, there can be used, for example, benzoyl peroxide, dicumyl peroxide, t-butylcumyl peroxide, di-t-butyl peroxide, α,α -bis(t-butylperoxy-isopropyl)benzene, 2,5-dimethyl-2,5-di(t-butylperoxy)hexane, 2,5-dimethyl-2,5-di(t-butylperoxy)hexyne-3 and the like.

The grafted ethylene-acrylic acid ester copolymer obtained in the present invention can be used in admixture with inorganic fillers, for example, calcium carbonate, mica, talc, diatomaceous earth, silica and the like; and fibrous articles, for example, glass fiber, carbon fiber, aramid fiber and the like. These fillers can be added to the ethylene-acrylic acid ester copolymer during its grafting reaction or can be added to the already grafted ethylene-acrylic acid ester copolymer.

According to the present invention, a grafted ethylene-acrylic acid ester copolymer can be produced by merely heating, melting and blending a powdery or bead-like ethylene-acrylic acid ester copolymer together with a specifically limited powdery block copolymer of the present invention in an extruder or injection molding machine. Therefore, the grafting reaction can be carried out without using a particular polymerization step which is a necessary step in the conventional method. Accordingly, the grafted product can be produced by means of a simple installation in a low production cost. Moreover, the grafting reaction and the forming step are concurrently carried out, and therefore the grafted product can be produced in a very low production cost.

Further, in the present invention, a small amount of various kinds of grafted ethylene-acrylic acid ester copolymer can be produced by merely changing the mixing ratio of the specifically limited block copolymer of the present invention with an ethylene-acrylic acid ester copolymer.

In the present invention, commonly used extruder, injection molding machine and kneader can be used, and a particular apparatus is not required.

According to the present invention, a high graft efficiency, which has not been attained by conventional methods, can be attained in a high reproducibility substantially without the influence due to the variation of reaction temperature, reaction time, addition amount and other conditions. Accordingly, the method for producing a grafted ethylene-acrylic acid ester copolymer of the present invention is not only effective as a method for producing a modified ethylene-acrylic acid ester copolymer which is free from drawbacks of ethylene-acrylic acid ester copolymer, but also effective as a method for producing a high-grade polymer alloy, which is required to have polydimensional functions (in the production of the high-grade polymer alloy, a high graft efficiency is required).

Moreover, the grafted ethylene-acrylic acid ester copolymer of the present invention can be used as a compatibilizing agent in the polymer blend of polyolefin with a styrene (co)polymer, as an emulsifying agent in high polymer emulsion, or as an adhesive or pressure-sensitive adhesive at the interface of polyolefin and styrene (co)polymer.

The present invention will be explained in more detail hereinafter referring to the following Reference examples, Examples and Comparative examples.

REFERENCE EXAMPLE 1

(Production of a peroxy group-containing block copolymer)

To 10 parts by weight of a monomer mixture, which was to be formed into copolymer A and consisted of 97% by weight of n-butyl methacrylate and 3% by weight of t-butylperoxy methacryloyloxyethyl carbonate as a radically copolymerizable peroxycarbonate, was added 0.5 part by weight of a polymerization initiator of a polymeric peroxide represented by the following formula

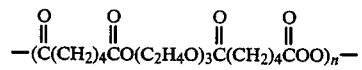

(average condensation degree $\bar{n}=4.5$, theoretical active oxygen content=3.96, and decomposition temperature at selected half-life value for 10 hours=63.5° C.) and the resulting mixture was fully mixed under stirring. Then, the mixture was added to 600 parts by weight of a 1% by weight aqueous solution of polyvinyl alcohol, which had previously been charged in a four-necked flask equipped with a cooler, and subjected to a suspension polymerization reaction at a temperature of 60°–80° C. for 5 hours under stirring. As the result, the conversion degree became 95% or more, and the completion of the polymerization reaction was ascertained, and the polymerization reaction was stopped to obtain copolymer A.

Then, 90 parts by weight of styrene, which was used as a monomer to be formed into (co)polymer B, was added to the above obtained aqueous suspension of the copolymer A, and the resulting mixture was further subjected to a polymerization reaction at a temperature of 70°–85° C. After completion of the polymerization reaction, the polymerization product was filtered, washed with water, and dried to obtain an aimed block copolymer.

The test results of the block copolymer were as follows.

Active oxygen content: 0.020% by weight
Number average molecular weight: 87,000
Block efficiency: 54%
Conversion degree in polymerization: 97%
Active oxygen content in the non-blocked polystyrene ((co)polymer B): 0.000%

The test methods were as follows.

Active oxygen content was determined by the iodometry.

Number average molecular weight was determined by the GPC measurement.

Block efficiency was determined by extracting non-blocked polystyrene with cyclohexane used as a solvent by means of a Soxhlet extractor.

Conversion degree in polymerization was calculated by the following formula, according to the gravimetric method.

$$\frac{\text{Weight of the resulting block copolymer}}{\text{Weight of the total monomers used}} \times 100$$

REFERENCE EXAMPLE 2

(Production of a block copolymer)

A block copolymer was produced in the same manner as described in Reference example 1, except that n-butyl methacrylate was used alone as a monomer to be formed into copolymer A, and a radically copolymerizable peroxy carbonate of t-butylperoxy methacryloyloxyethyl carbonate was not used.

The resulting block copolymer had a number average molecular weight of 89,000.

EXAMPLE 1

In a Brabender mixer, 100 parts by weight of an ethylene-ethyl acrylate copolymer (trademark: NUC Copolymer DPDJ-6169, sold by Nippon Unicar Co., Ltd., ethyl acrylate content: 18%, MI 6) as an ethylene-acrylic acid ester copolymer was kneaded together with 30 parts by weight of the peroxy group-containing block copolymer produced in Reference example 1 at 180° C. for 5 minutes to obtain a resin composition.

The graft efficiency was measured by subjecting the resin composition to a fractional precipitation. That is, the resin composition was dissolved in a given amount of hot benzene, and the benzene solution was poured into 50 times amount (weight ratio) of acetone. After the mass was left to stand for one night, the supernatant liquid was removed by a decantation, and then the precipitate was filtered. The ungrafted, i.e., unreacted peroxy group-containing block copolymer dissolves or disperses in acetone. Therefore, the unreacted peroxy group-containing block copolymer can be separated from the precipitate consisting of grafted ethylene-ethyl acrylate copolymer and ungrafted ethylene-ethyl acrylate copolymer. The precipitate separated through the filtration was dried under reduced pressure, and the weight of the dried precipitate was measured, whereby the graft efficiency of the peroxy group-containing block copolymer onto the ethylene-ethyl acrylate copolymer was measured. The obtained results are shown in Table 1.

It has been ascertained by the nuclear magnetic resonance spectrum and infrared absorption spectrum analysis that the separated grafted product contains polystyrene introduced thereinto.

EXAMPLE 2

A resin composition was produced in the same manner as described in Example 1, except that the kneading temperature was varied to 220° C. from 180° C. used in Example 1, and the graft efficiency was measured in the same manner as described in Example 1. The obtained results are shown in Table 1.

EXAMPLE 3

A resin composition was produced in the same manner as described in Example 1, except that the kneading temperature was varied to 270° C. from 180° C. used in Example 1, and the graft efficiency was measured in the same manner as described in Example 1. The obtained results are shown in Table 1.

EXAMPLE 4

A grafted product was produced in the same manner as described in Example 1, except that 0.1 part by weight of dicumyl peroxide (trademark: Percumyl D, sold by Nippon Oil and Fats Co., Ltd., hereinafter abbreviated as DCP) was added to the reaction system before the kneading, and the graft efficiency was calculated in the same manner as described in Example 1. The obtained results are shown in Table 1.

EXAMPLE 5

A mixture of 100 parts by weight of the ethylene-ethyl acrylate copolymer and 100 parts by weight of the peroxy group-containing block copolymer, both of which were the same as those used in Example 1, was previously produced, and the mixture was extruded at 230° C. through an extruder into a pellet-like resin composition. Then, the graft efficiency was measured by subjecting the resulting pellet-like resin composition to the same fractional precipitation as described in Example 1. The obtained results are shown in Table 1.

EXAMPLE 6

The experiment of Example 1 was repeated, except that 99.5 parts by weight of the ethylene-ethyl acrylate copolymer was used in place of 100 parts by weight, and 0.5 part by weight of the peroxy group-containing block copolymer was used in place of 30 parts by weight used in Example 1. The obtained results are shown in Table 1.

EXAMPLE 7

The experiment of Example 1 was repeated, except that 30 parts by weight of the ethylene-ethyl acrylate copolymer was used, and 70 parts by weight of the peroxy group-containing block copolymer was used. The obtained results are shown in Table 1.

REFERENCE EXAMPLE 3

A peroxy group-containing block copolymer was produced in the same manner as described in Reference example 1, except that 10 parts by weight of a mixture consisting of 97% by weight of ethyl acrylate and 3% by weight of t-butylperoxy methacryloyloxyethyl carbonate as a radically copolymerizable peroxycarbonate was used as a monomer mixture for the production of copolymer A.

The active oxygen content and number average molecular weight of the resulting block copolymer, the block efficiency and conversion degree in the polymerization, and the active oxygen content in the non-blocked polystyrene ((co)polymer B) were measured in the same manner as described in Reference example 1. The obtained results are as follows.

Active oxygen content: 0.019% by weight
Number average molecular weight: 93,000
Block efficiency: 57%
Conversion degree in polymerization: 98%
Active oxygen content in the non-blocked polystyrene ((co)polymer B): 0.000%

REFERENCE EXAMPLE 4

A peroxy group-containing block copolymer was produced in the same manner as described in Reference example 1, except that 10 parts by weight of a mixture consisting of 97% by weight of n-butyl acrylate and 3% by weight of t-butylperoxy methacryloyloxyethyl carbonate as a radically copolymerizable peroxycarbonate was used as a monomer mixture for the production of copolymer A.

The active oxygen content and number average molecular weight of resulting block copolymer, the block efficiency and conversion degree in the polymerization, and the active oxygen content in the non-blocked polystyrene ((co)polymer (B)) were measured in the same manner as described in Reference example 1.

The obtained results are as follows.
Active oxygen content: 0.020% by weight
Number average molecular weight: 84,000
Block efficiency: 57%
Conversion degree in polymerization: 98%
Active oxygen content in the non-blocked polystyrene ((co)polymer B): 0.000%

EXAMPLE 8

A resin composition was produced in the same manner as described in Example 1, except that the peroxy group-containing block copolymer produced in Reference example 3 was used, and the graft efficiency was measured in the same manner as described in Example 1. The obtained results are shown in Table 1.

EXAMPLE 9

A resin composition was produced in the same manner as described in Example 1, except that the peroxy group-containing block copolymer produced in Reference example 4 was used, and the graft efficiency was measured in the same manner as described in Example 1. The obtained results are shown in Table 1.

REFERENCE EXAMPLE 5

A peroxy group-containing block copolymer was produced in the same manner as described in Reference example 1, except that 90 parts by weight of a mixture consisting of 70% by weight of styrene and 30% by weight of methyl methacrylate was used as a monomer for the production of copolymer B.

The active oxygen content and number average molecular weight of the resulting block copolymer, the block efficiency and conversion degree in the polymerization, and the active oxygen content in the non-blocked styrene copolymer ((co)polymer B) were measured in the same manner as described in Reference example 1.

The obtained results are as follows.
Active oxygen content: 0.020% by weight
Number average molecular weight: 85,000
Block efficiency: 55%
Conversion degree in polymerization: 98%
Active oxygen content in the non-blocked polystyrene copolymer ((co)polymer B): 0.000%

EXAMPLE 10

A resin composition was produced in the same manner as described in Example 1, except that the peroxy group-containing block copolymer produced in Reference example 5 was used, and the graft efficiency was measured in the same manner as described in Example 1. The obtained results are shown in Table 1.

COMPARATIVE EXAMPLE 1

A resin composition was produced in the same manner as described in Example 1, except that the block copolymer produced in Reference example 2 was used in place of the peroxy group-containing block copolymer used in Example 1, and the graft efficiency was measured in the same manner as described in Example 1. The obtained results are shown in Table 2.

COMPARATIVE EXAMPLE 2

A resin composition was produced in the same manner as described in Comparative example 1, except that 0.1 part by weight of DCP was added to the reaction system before the kneading, and the graft efficiency was measured in the same manner as described in Example 1. The obtained results are shown in Table 2.

COMPARATIVE EXAMPLE 3

A resin composition was produced in the same manner as described in Example 1, except that polystyrene (trademark: Dialex, sold by Mitsubishi Monsanto Chemical Co., number average molecular weight: 100,000) was used in place of the peroxy group-containing block copolymer used in Example 1, and the graft efficiency was measured in the same manner as described in Example 1. The obtained results are shown in Table 2.

COMPARATIVE EXAMPLE 4

A resin composition was produced in the same manner as described in Comparative example 1, except that a kneading was carried out at a temperature of 220° C. in place of 180° C. used in Comparative example 1, and the graft efficiency was measured in the same manner as described in Example 1. The obtained results are shown in Table 2.

COMPARATIVE EXAMPLE 5

A resin composition was produced in the same manner as described in Example 1, except that a kneading was carried out at a temperature of 130° C. However, the peroxy group-containing block copolymer was not completely melted and a homogeneous resin composition was not able to be obtained.

COMPARATIVE EXAMPLE 6

A resin composition was produced in the same manner as described in Example 1, except that a kneading was carried out at a temperature of 320° C. However, the peroxy group-containing block copolymer was decomposed during the kneading.

REFERENCE EXAMPLE 6

A peroxy group-containing block copolymer was produced in the same manner as described in Reference example 1, except that 10 parts by weight of a mixture consisting of 99.8% by weight of n-butyl methacrylate and 0.2% by weight of t-butylperoxy acryloyloxyethyl carbonate as a radically copolymerizable peroxycarbonate was used as a monomer mixture for the production of copolymer A.

The active oxygen content and number average molecular weight of the resulting peroxy group-containing block copolymer, the block efficiency and conversion degree in the polymerization, and the active oxygen content in the non-blocked polystyrene ((co)polymer B) were measured in the same manner as described in Reference example 1.

The obtained results are as follows.
Active oxygen content: 0.001% by weight
Number average molecular weight: 90,000

Block efficiency: 55%
Conversion degree in polymerization: 97%
Active oxygen content in the non-blocked polystyrene ((co)polymer B): 0.000%

COMPARATIVE EXAMPLE 7

A resin composition was produced in the same manner as described in Example 1, except that the peroxy group-containing block copolymer produced in Reference example 6 was used, and the graft efficiency was measured in the same manner as described in Example 1. The obtained results are shown in Table 2.

REFERENCE EXAMPLE 7

A peroxy group-containing block copolymer was produced in the same manner as described in Reference example 1, except that 10 parts by weight of a mixture consisting of 70% by weight of n-butyl acrylate, 27% by weight of styrene and 3% by weight of t-butylperoxy methacryloyloxyethyl carbonate as a radically copolymerizable peroxycarbonate was used as a monomer mixture for the production of copolymer A.

The active oxygen content and number average molecular weight of the resulting peroxy group-containing block copolymer, the block efficiency and conversion degree in the polymerization, and the active oxygen content in the non-blocked polystyrene ((co)polymer B) were measured in the same manner as described in Reference example 1.

The obtained results are as follows.
Active oxygen content: 0.020% by weight
Number average molecular weight: 85,000
Block efficiency: 60%
Conversion degree in polymerization: 97%
Active oxygen content in the non-blocked polystyrene ((co)polymer B): 0.000%

REFERENCE EXAMPLE 8

A peroxy group-containing block copolymer was produced in the same manner as described in Reference example 1, except that t-hexylperoxy methacryloyloxyethyl carbonate was used as a radically copolymerizable peroxycarbonate in the production of copolymer A.

The active oxygen content and number average molecular weight of the resulting peroxy group-containing block copolymer, the block efficiency and conversion degree in the polymerization, and the active oxygen content in the non-blocked polystyrene ((co)polymer B) were measured in the same manner as described in Reference example 1.

The obtained results are as follows.
Active oxygen content: 0.017% by weight
Number average molecular weight: 79,000
Block efficiency: 56%
Conversion degree in polymerization: 97%
Active oxygen content in the non-blocked polystyrene ((co)polymer B): 0.000%

REFERENCE EXAMPLE 9

A peroxy group-containing block copolymer was produced in the same manner as described in Reference example 1, except that cumylperoxy methacryloyloxyethyl carbonate was used as a radically copolymerizable peroxycarbonate in the production of copolymer A.

The active oxygen content and number average molecular weight of the resulting peroxy group-containing block copolymer, the block efficiency and conversion degree in the polymerization, and the active oxygen content in the non-blocked polystyrene ((co)polymer B) were measured in the same manner as described in Reference example 1.

The obtained results are as follows.
Active oxygen content: 0.015% by weight
Number average molecular weight: 84,000
Block efficiency: 55%
Conversion degree in polymerization: 97%
Active oxygen content in the non-blocked polystyrene ((co)polymer B): 0.000%

EXAMPLE 11

A resin composition was produced in the same manner as described in Example 1, except that the peroxy group-containing block copolymer produced in Reference example 7 was used in place of the peroxy group-containing block copolymer used in Example 1, and the graft efficiency was measured in the same manner as described in Example 1. The obtained results are shown in Table 3.

EXAMPLE 12

A resin composition was produced in the same manner as described in Example 1, except that the peroxy group-containing block copolymer produced in Reference example 8 was used in place of the peroxy group-containing block copolymer used in Example 1, and the graft efficiency was measured in the same manner as described in Example 1. The obtained results are shown in Table 3.

EXAMPLE 13

A resin composition was produced in the same manner as described in Example 1, except that the peroxy group-containing block copolymer produced in Reference example 9 was used in place of the peroxy group-containing block copolymer used in Example 1, and the graft efficiency was measured in the same manner as described in Example 1. The obtained results are shown in Table 3.

TABLE 1

| Example | Ethylene-ethylacrylate copolymer (parts by weight) | Peroxy group-containing block copolymer (parts by weight) | DCP (parts by weight) | Temperature (°C.) | Graft efficiency (%) |
|---|---|---|---|---|---|
| 1 | 100 | 30 | 0 | 180 | 47 |
| 2 | 100 | 30 | 0 | 220 | 43 |
| 3 | 100 | 30 | 0 | 270 | 42 |
| 4 | 100 | 30 | 0.1 | 180 | 51 |
| 5 | 100 | 100 | 0 | 230 | 49 |
| 6 | 99.5 | 0.5 | 0 | 180 | 43 |
| 7 | 30 | 70 | 0 | 180 | 39 |
| 8 | 100 | 30 | 0 | 180 | 45 |
| 9 | 100 | 30 | 0 | 180 | 45 |
| 10 | 100 | 30 | 0 | 180 | 47 |

TABLE 2

| Comparative example | Ethylene-ethyl acrylate copolymer (parts by weight) | Styrene block copolymer (parts by weight) | DCP (parts by weight) | Temperature (°C.) | Graft efficiency (%) |
|---|---|---|---|---|---|
| 1 | 100 | 30 | 0 | 180 | 2 |
| 2 | 100 | 30 | 0.1 | 180 | 5 |
| 3 | 100 | 30 | 0 | 180 | 0 |

TABLE 2-continued

| Comparative example | Ethylene-ethyl acrylate copolymer (parts by weight) | Styrene block copolymer (parts by weight) | DCP (parts by weight) | Temperature (°C.) | Graft efficiency (%) |
| --- | --- | --- | --- | --- | --- |
| 4 | 100 | 30 | 0 | 220 | 3 |
| 7 | 100 | 30 | 0 | 180 | 7 |

TABLE 3

| Example | Ethylene-ethylacrylate copolymer (parts by weight) | Peroxy group-containing block copolymer (parts by weight) | DCP (parts by weight) | Temperature (°C.) | Graft efficiency (%) |
| --- | --- | --- | --- | --- | --- |
| 11 | 100 | 30 | 0 | 180 | 48 |
| 12 | 100 | 30 | 0 | 180 | 42 |
| 13 | 100 | 30 | 0 | 180 | 38 |

What is claimed is:

1. A method for producing a grafted ethylene-acrylic acid ester copolymer, comprising reacting a block copolymer consisting of segments of copolymer A and segments of (co)polymer B with an ethylene-acrylic acid ester copolymer under a melted state, said copolymer A being a copolymer of a (meth)acrylic acid ester monomer or a mixture of a (meth)acrylic acid ester monomer and a radically copolymerizable monomer copolymerizable with the (meth)acrylic acid ester monomer, with a radically copolymerizable peroxycarbonate represented by the following general formula (I), and said (co)polymer B being a (co)polymer having a monomer composition different from that of copolymer A and not containing a monomer unit of the radically copolymerizable peroxycarbonate represented by the following general formula (I), said general formula (I) being

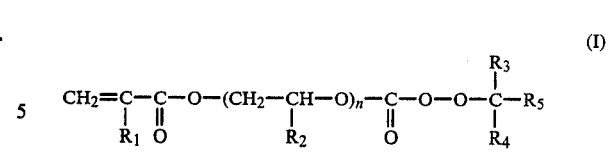

wherein $R_1$ represents a hydrogen atom or an alkyl group having 1 or 2 carbon atoms; $R_2$ represents a hydrogen atom or a methyl group; $R_3$ and $R_4$ represent same or different alkyl groups having 1–4 carbon atoms; $R_5$ represents a phenyl group or an alkyl group or alkyl-substituted phenyl group having 1–12 carbon atoms or a cycloalkyl group having 3–12 carbon atoms; and n is a positive integer of 1 or 2.

2. A method according to claim 1, wherein the grafting reaction of the block copolymer with the ethylene-acrylic acid ester copolymer is carried out in a mixing ratio that the mixture of the ethylene-acrylic acid ester copolymer and the block copolymer consists of 10–99.9% by weight of the ethylene-acrylic acid ester copolymer and 90–0.1% by weight of the block copolymer.

3. A method according to claim 1, wherein the block copolymer is reacted with the ethylene-acrylic acid ester copolymer at a temperature of 150°–300° C. under a melted state.

4. A method according to claim 1, wherein the (meth)acrylic acid ester monomer to be used for the production of copolymer A of the block copolymer is n-butyl methacrylate.

5. A method according to claim 1, wherein the (meth)acrylic acid ester monomer to be used for the production of copolymer A of the block copolymer is ethyl acrylate.

6. A method according to claim 1, wherein one component of a component mixture to be used for the production of copolymer A of the block copolymer is n-butyl acrylate.

7. A method according to claim 1, wherein the monomer to be used for the production of (co)polymer B of the block copolymer is styrene or a mixture thereof.

8. A method according to claim 1, wherein the radically copolymerizable peroxycarbonate is t-butylperoxy methacryloyloxyethyl carbonate.

9. A method according to claim 1, wherein the block copolymer contains at least 0.002% by weight of active oxygen.

* * * * *